United States Patent Office 3,507,238
Patented Apr. 21, 1970

3,507,238
SEMISUBMERSIBLE OIL STORAGE VESSEL
Philip Yeong-Wai Chow, Orinda, Calif., assignor to Santa Fe International Corporation, Los Angeles, Calif., a corporation of California
Filed Mar. 26, 1968, Ser. No. 716,080
Int. Cl. B36b 35/44, 25/08
U.S. Cl. 114—.5    45 Claims

ABSTRACT OF THE DISCLOSURE

The vessel includes a concrete hull having an oil storage chamber and buoyancy compartments. Upstanding stabilizing columns are mounted on the hull on opposite sides of the pitch and roll axes of the vessel, one or more of which support a working platform in spaced relation above the hull. The columns extend vertically and the platform is spaced above the hull a distance greater than the maximum anticipated wave height. The hull buoyantly supports the vessel with the hull having freeboard. At the site, the storage chamber is ballasted with sea water to submerge the hull and portions of the stabilizing columns. Oil from the production site is piped into the storage chamber to displace the water from the chamber. To minimize wave impaction against the hull and to stabilize the vessel in the semisubmerged floating condition, the displacement of the hull and submerged column portions is such that, in the sea water ballasted condition, the distance between the mean waterline and the undersurface of the platform is no less than half the maximum anticipated wave height, and, in the oil loaded condition, the distance between the hull and the mean waterline is not less than half the maximum anticipated wave height. For a predetermined hull configuration, the columns are located and have areas such that the natural period of the vessel is outside the normally anticipated range of periods of significant anticipated waves.

---

The present invention relates to an offshore oil storage facility and particularly to a semisubmersible column stabilized floating oil storage vessel for use in receiving and storing oil at an offshore production site.

In many offshore oil producing installations, it is customary to lay pipe lines between the producing wells and a nearby shore facility whereby the oil may be pumped directly from the wells through the pipe lines to the shore facility. Underwater pipe lines, however, are difficult and expensive to lay and become increasingly impractical and uneconomical as a method of marine oil transport where production sites are located great distances from the shore facility and where the depth of water in which the piping must be laid is excessive.

Attention has been directed in recent years to apparatus and methods for accumulating the oil from the wells at the production site in large quantities with ultimate delivery to the shore facility being provided by tankers or barges plying between the production site and the shore facility. These methods and apparatus may be generally categorized as providing oil storage tanks located at the production site for the continuous reception of oil from the wells and which are either in a fully submerged sea bottom engaging position or a surface floating condition, only limited attention to date being directed to semisubmerged floating tanks. Oil storage facilities of the submerged type usually comprise a plurality of tanks secured to the sea bottom and connected to the well heads whereby oil flows directly from the well heads into the tanks. To transport the oil to the shore facility, the outlet end of an oil discharge conduit which communicates with the underwater tanks is carried by a surface floating buoy or a fixed production platform whereby tankers or barges can connect to such conduit and the oil pumped from the tanks to the tankers or barges. Underwater tanks, however, have inherent limitations. For example, the sea bottom is sometimes excessively soft and thereby unable to provide support for the tanks. Moreover, the sea bottom is sometimes irregular and thereby incapable of providing uniform bearing support for the tanks. Submerged tanks are also difficult to install and maintain in deep water. Additionally, the use of such tanks would normally be limited to the water depths in which the normally adjacent control platforms can be installed. Moreover, these fixed fully submerged tanks are not readily mobile for transit to and use at other production sites.

It has been proposed that the oil production platform be provided with tanks to accumulate the oil for ultimate delivery to oil tankers or barges which ply between the production platform and the shore facility. The oil storage capacity, in these instances, is, however, extremely limited. In some instances, dummy tankers have been anchored adjacent the production sites to supplement such storage capacity or to provide the sole oil storage facility. However, this is an uneconomical use of tankers which are not designed for this type of operation and as such are not optimally employed. In general, surface floating oil storage facilities such as tankers, floating tanks and the like, are subject to wind and wave action which causes excessive motion of such facilities whereby their anchoring, general operation, etc. are greatly inhibited.

Some attention has been recently directed to semisubmerged floating oil storage stations. The trend in this area has been toward the development of limited capacity tanks ballasted with sea water and oil for submergence below the waterline with towers extending from the submerged tanks above the mean waterline and carrying the oil intake and outlet conduits. These stations are usually not manned, normally provide complex valving and piping arrangements and are expensive to construct, all of which evidences the need for a truly large capacity, inexpensive semisubmersible oil storage vessel. Moreover, these stations are not designed to avoid motion amplification when the period of the waves is the same as or close to the natural period of the vessel.

The present invention provides a semisubmersible oil storage vessel which minimizes the above-discussed and other shortcomings of prior offshore oil storage facilities and provides various advantages in construction, mode of operation and result over such prior facilities. Generally, this is accomplished by providing a hull having a large oil storage capacity and a plurality of stabilizing columns upstanding from the hull for heights greater than the maximum anticipated wave height, one or more columns supporting a working platform at their upper ends. The hull is preferably formed of prestressed concrete and, in use, the vessel is usually moored to a buoy carrying oil discharge lines from the oil production site. If conditions permit, the vessel may be secured to fixed moorings. Sea water is admitted to the storage chamber to submerge the hull and portions of the columns such that the distance between the mean waterline and the undersurface of the platform is no less than half the maximum anticipated wave height. For a predetermined hull configuration, the location and areas of the columns are such that the natural period of the vessel is outside the normally anticipated range of periods of significant waves. Oil from the production site is admitted to the storage chamber and displaces the water from the storage chamber. As oil is received, the vessel rises such that, when maximum oil storage capacity is obtained, the distance between the mean waterline and the top of the hull is no less than half the maximum anticipated wave height. An oil discharge conduit is provided whereby oil can be pumped from the storage vessel to a tanker via a buoy moored to the storage vessel.

Accordingly, it is a primary object of the present invention to provide a semisubmersible oil storage vessel.

It is another object of the present invention to provide a semisubmersible oil storage vessel which, when in the floating semisubmerged condition, has the characteristic of minimizing vessel motion due to excitation forces caused by wave action (hereinafter called "motion minimizing characteristics"). It is a related object to provide such an oil storage vessel affording improved motion minimizing characteristics in vessel pitch, roll and heave.

It is still another object of the present invention to provide a semisubmersible oil storage vessel having a working platform spaced above the hull. It is a related object to provide a vessel of this type having flow control and production facilities.

It is another related object of the present invention to provide a semisubmersible oil storage vessel having a storage chamber for receiving both sea water ballast and oil for storage (the oil displacing the sea water ballast in the storage chamber). It is a further related object to provide such an oil storage vessel wherein motion minimizing characteristics are obtained in either the sea water ballasted or oil loaded conditions or at any intermedate oil-sea water loading.

It is a further related object of the present invention to provide a semisubmersible oil storage vessel wherein its natural period is outside of the normally anticipated range of periods of significant waves.

It is a further object of the present invention to provide a semisubmersible oil storage vessel which can be inexpensively constructed and which is preferably formed of concrete.

It is a still further object of the present invention to provide a semisubmersible oil storage vessel having rapid mobility in transit and a large oil storage capacity.

It is a still further object of the present invention to provide a semisubmersible oil storage vessel having auxiliary propulsion means sufficient to minimize the strain on a single point mooring buoy during high sea states.

It is a further related object of the present invention to provide a self-contained semisubmersible oil storage vessel having optimum motion minimizing characteristics whereby the vessel is maintained within heel and trim angle limits acceptable for the comfort of the crew and to minimize the mixing of water and oil at their interface in the storage chamber.

It is a still further related object of the present invention to provide an oil storage vessel wherein oil-water separation is effectively maintained in the area of the oil discharge conduit, notwithstanding vessel motion.

It is a still further object of the present invention to provide an oil storage vessel wherein the danger of explosion is eliminated.

It is a still further object hereof to provide an oil storage vessel having an oil-water storage chamber including a water-sludge separator to recover sludge and to avoid polluting the sea water.

These and other related objects and advantages of the present invention will become more apparent from the following specification, claims and appended drawings, wherein:

Three embodiments of the present vessel are herein illustrated, two in detail and a third schematically. To provide readily understood notation, like parts in each embodiment have like reference numerals and, where the letter notation a, b, or c follows the numeral designation, the parts so designated comprise the like parts as employed in the embodiments illustrated in FIGURES 1–6, FIGURES 7–11, or FIGURE 12, respectively.

Figure 1:
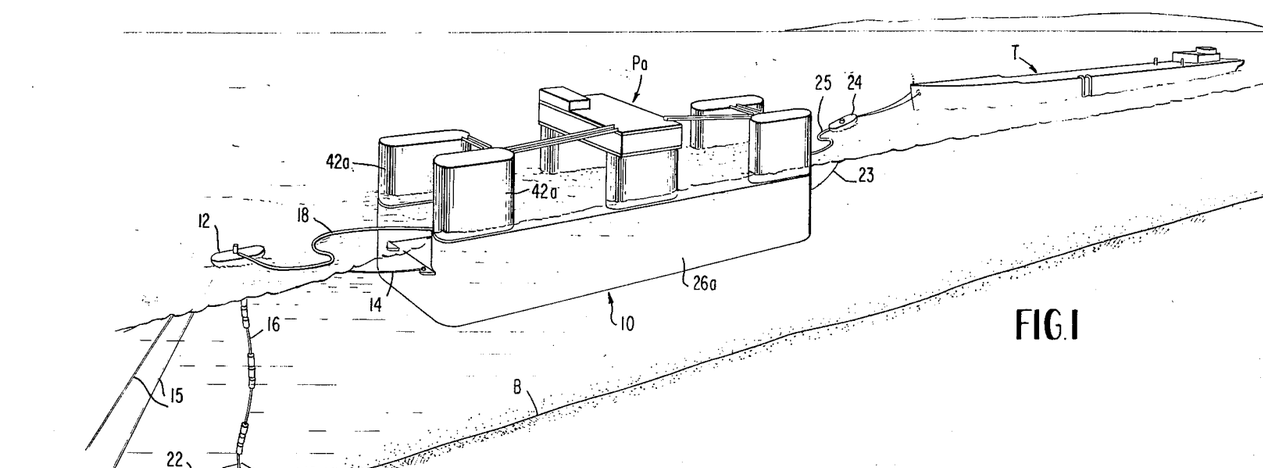
FIGURE 1 is a perspective view of a semisubmersible oil storage vessel constructed in accordance with the present invention and illustrated in an oil receiving storage condition moored to a buoy with a tanker moored nearby.

Referring to the drawings, particularly FIGURE 1, there is shown a semisubmersible oil storage vessel, generally indicated at 10, which is representative of each of the vessel embodiments herein illustrated although specifically illustrating the vessel embodiment depicted in FIGURES 1–6. Vessel 10 is normally moored at one end to a single mooring buoy 12 as by lines 14. Buoy 12 is conventionally anchored to the sea bottom B by anchor lines 15 and anchors, not shown. An oil riser or risers 16 is supported at its upper end by buoy 12 and has a suitable connection, not shown, whereby a floating oil intake line 18 may be connected between the upper end of riser 16 and vessel 10. The opposite lower end of riser 16 connects with a distribution head or manifold 20 which receives oil through intake lines 22 connected to the well heads or a production platform, the line 22 and distribution head 20 normally lying along the sea bottom B. A second buoy 24 is moored to vessel 10 at its opposite end by lines 23 and provides a single point mooring for a tanker T which receives oil from storage vessel 10 through floating oil discharge lines 25.

Figure 2:
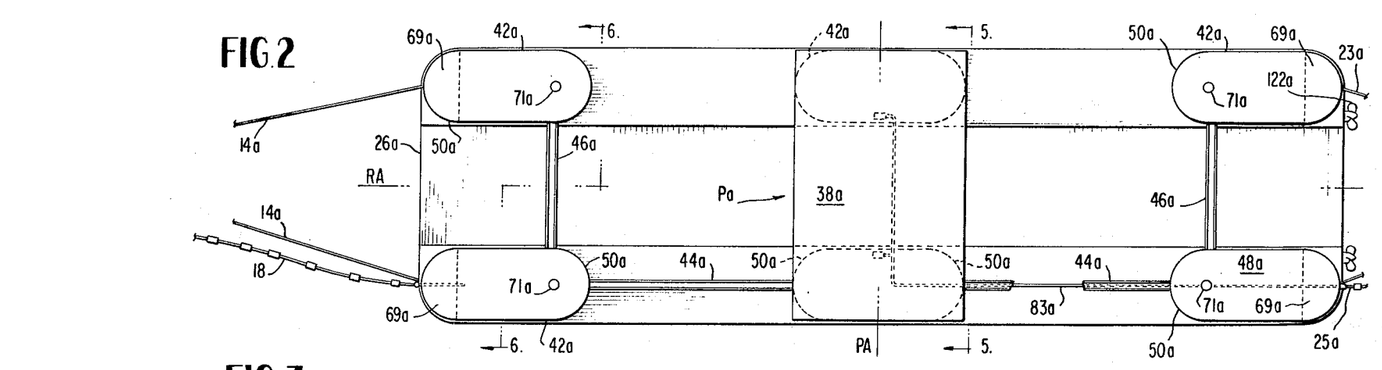
FIGURE 2 is a top plan view of the semisubmersible oil storage vessel.
Figure 3:
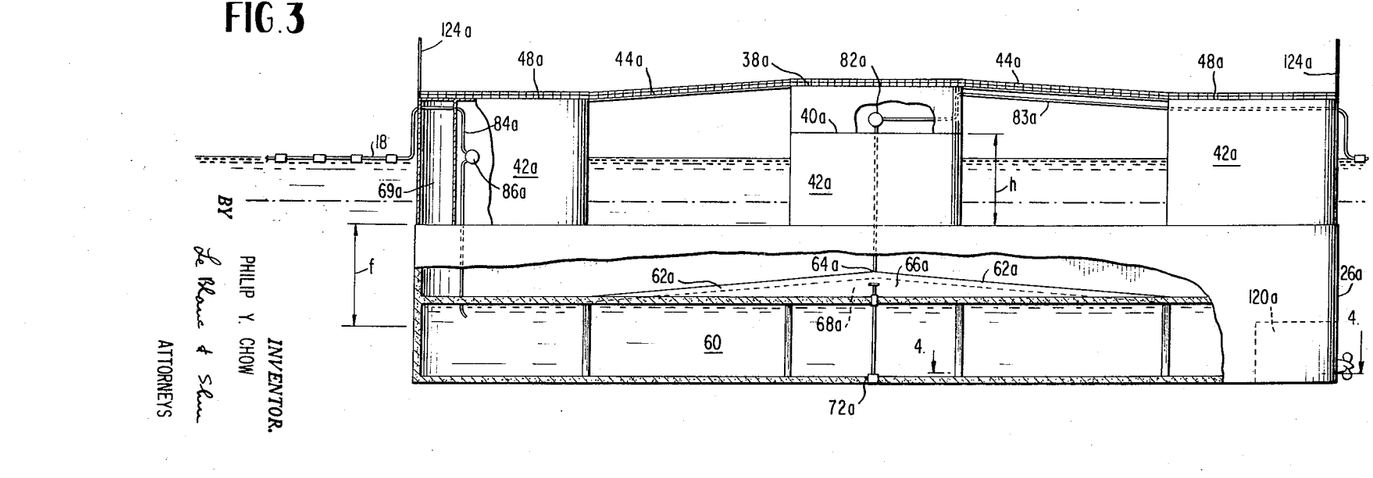
FIGURE 3 is a side elevational view thereof with portions broken away and in section for ease of illustration.
Figure 4:
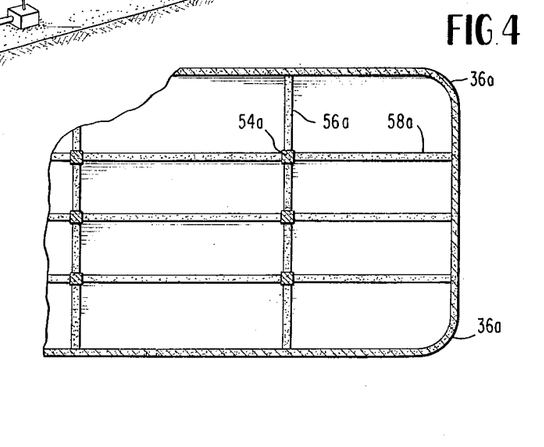
FIGURE 4 is a fragmentary horizontal sectional view thereof taken about on line 4—4 of FIGURE 3.
Figure 5:
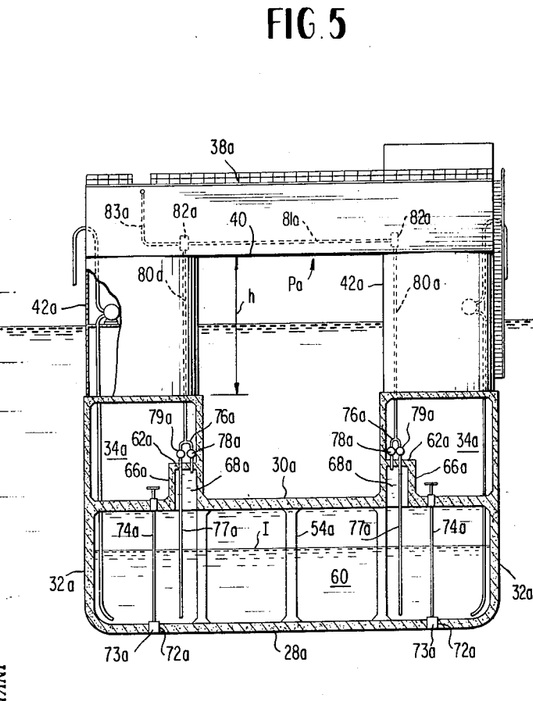
FIGURE 5 is a transverse sectional view thereof taken about on line 5—5 of FIGURE 2.
Figure 6:
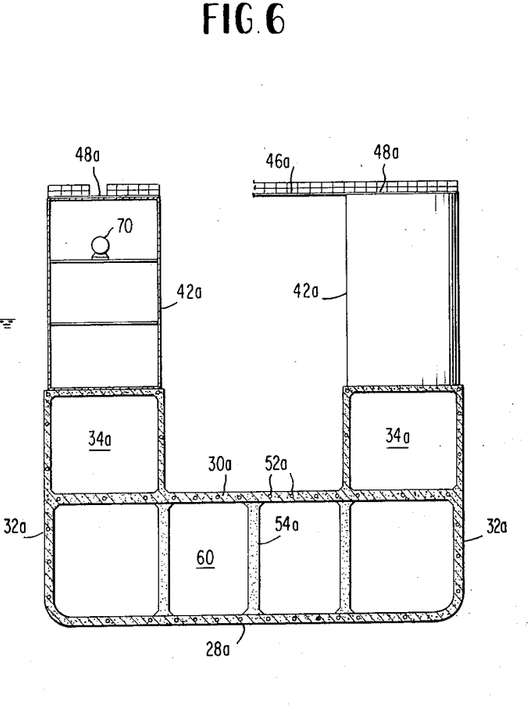
FIGURE 6 is a transverse sectional view thereof taken about on line 6—6 of FIGURE 2.

As best illustrated in FIGURES 2 and 3, storage vessel 10 comprises an elongated hull 26a providing sufficient displacement (when the storage vessel is empty containing neither sea water nor oil) to support vessel 10 in the surface-floating low draft condition with the hull 26a having freeboard indicated at $f$ in FIGURE 3. Hull 26a is substantially rectangular in cross section as seen in FIGURES 5 and 6 having a bottom and an upper wall 28a and 30a, respectively, and sidewalls 32a. In this form, hull 26a includes a pair of buoyancy chambers 34a disposed above upper wall 30a and transversely spaced one from the other to lie coextensive in length with vessel 10 along opposite sides thereof. As seen in FIGURE 4, the bow and stern portions 36a are arcuate in horizontal section to provide a substantially streamlined shape to minimize resistance to towing. In this embodiment, a working platform Pa, comprising a main deck 38a and a lower deck 40a which may house the crew's quarters, pumping equipment, and other auxiliary equipment, is supported a predetermined height above hull 26a preferably substantially medially of the length of vessel 10 by a support structure including a laterally spaced pair of stabilizing columns 42a. Additional laterally spaced pairs of stabilizing columns 42a are provided adjacent the opposite ends of vessel 10 whereby three pairs of longtiudinally spaced columns 42a are provided. Catwalks 44a extend from platform Pa in opposite directions to the stabilizing columns 42a of each of the end pairs of columns and laterally extending catwalks 46a extend from the latter end columns to the transversely opposite end columns, providing access to and from platform Pa and the upper decks 48a of each column and providing support for pipework.

As discussed more fully hereinafter, the intermediate pair of columns 42a extend upwardly from the upper surface of hull 26a, i.e., the upper wall of buoyancy chambers 34a, an effective height $h$ to the undersurface of platform Pa substantially greater than the maximum anticipated wave height, the vertical distance between wave crest and trough. It will be noted that the end pairs of columns 42a extend upwardly a greater distance than the intermediate pair of columns 42a. As illustrated in FIGURE 2, columns 42a preferably are generally oblong shaped with longitudinally elongated vertical sides and semicylindrical fore and aft vertical end sections 50a. It will be understood, however, that columns 42a may have circular, elliptical or other cross sectional configurations as desired. Stabilizing columns 42a are preferably constant in cross sectional area throughout their effective height. Columns 42a provide motion minimizing characteristics when the vessel is in the floating semisubmerged condition and fully loaded with either sea water or oil or in any intermediate oil-water loaded condition as noted hereinafter.

In accordance with the present invention, hull 26a is formed of prestressed concrete. As seen in FIGURES 5 and 6, the bottom and upper walls 28a and 30a, respectively, the sidewalls 32a, and the upper and inner walls defining the buoyancy chambers 34a are all formed of prestressed concrete. Such concrete construction preferably includes pretensioned cables 52a extending through the concrete whereby when the poured concrete sets, and the tension on the cables is relieved and transferred to the concrete resulting in the compression of the latter, a strong integral hull is provided. As seen in FIGURES 4–6, additional support structure may be provided in the form of upright concrete stanchions 54a extending between hull bottom 28a and wall 30a at longitudinally and transversely spaced positions throughout the full length of the hull. Additional transverse and longitudinal reinforced concrete beams 56a and 58a, respectively, may also be provided. This additional support structure may take other forms such as, for example, longitudinally and/or transversely extending prestressed concrete trusses or trusses or beams formed of other materials. In this manner, it will be seen that the entire hull area defined by bottom 28a, upper wall 30a, and sides 32a provides a large storage chamber 60a which extends throughout the full length and breadth of hull 26a and which is preferably open throughout such extent. Storage chamber 60a, of course, could be compartmented as desired. The inner walls defining chamber 60a are preferably coated and lined with an inert material, such as a polyester, which is impervious to sea water and oil.

In this form, buoyancy chambers 34a preferably comprise air chambers coextensive in length with vessel 10 and may house additional auxiliary equipment as desired. Access into air chambers 34a is provided through columns 42a via suitable hatches, not shown. Air chambers 34a may be compartmented to provide individual air chambers if desired and may also have additional support bracing, particularly in the area below the columns 42a to support the latter.

As illustrated in FIGURES 3 and 5, a pair of chambers or raised oil discharge areas are superposed over chamber 60a along opposite side portions of vessel 10. Each chamber or area is defined by a pair of upper wall portions 62a which incline upwardly from adjacent opposite end portions of the vessel and terminate at an apex 64a raised above upper wall 30a in the area of hull 26a below an intermediate column 42a. These wall portions 62a, together with sidewalls 66a, project into buoyancy chambers 34a and form upwardly inclined channels or areas 68a raised above the upper surface 30a of and in free communication with storage chamber 60a for purposes as will presently become clear.

The remaining portions of vessel 10 are formed of the usual ship construction materials and preferably columns 42a are formed of steel which may be mounted and set into place on hull 26a after the latter is formed and floated. Columns 42a, in this form, are disposed along outboard portions of hulls 26a as shown in FIGURES 5 and 6. The columns 42a are spaced predetermined distances from the longitudinal and transverse centerlines of the hull to develop predetermined moments of inertia of the water plane areas about the roll and pitch axes and thereby provide optimum vessel motion minimizing and stability characteristics as noted hereinafter.

As shown in FIGURE 2, semicylindrical trim tanks 69a are provided in each of the outer end portions of the end pairs of columns 42a. The end pairs of columns 42a each carry a pump 70a (FIGURE 6) for independently and selectively ballasting and deballasting the associated trim tank 69a through suitable piping, not shown, to selectively alter the attitude of the vessel. It will be noted that the columns 42a can be vertically compartmented to provide additional space for auxiliary equipment, machinery, etc., with access into columns 42a being provided through hatches 71a.

A pair of openings 72a are provided through bottom 28a preferably about midships. Valves 73a are arranged to selectively open and close openings 72a by operation of valve spindles 74a which can be manually rotated from within buoyancy chambers 34a. Other types of valve actuating mechanisms can be provided, including valves remotely controlled from platform Pa. An oil outlet or discharge conduit 76a terminates at its lower end in each of channels or areas 68a adjacent the apex portions 64a and a pair of dewatering conduits 77a terminate at their lower ends in storage chamber 60a adjacent bottom 28a. Conduits 76a and 77a have suitable valves as at 78a and 79a, respectively, and respective pairs of conduits 76a and 77a connect with risers 80a which pass upward through associated buoyancy chambers 34a and intermediate columns 42a for connection at their upper ends with a cross conduit 81a and a pumping unit 82a. Pumping unit 82a includes a valve which can selectively vent chamber 60a through conduits 76a and risers 80a for reasons noted hereinafter. Unit 82a also includes a meter whereby the quantity of oil discharged from the vessel can be determined. An oil discharge conduit 83a connects with the discharge end of pumping unit 82a and extends longitudinally below catwalk 44a into one of the end columns 42a for connection with discharge line 25a.

The oil intake conduit 18 connects with a suitable riser 84a carried in one of the end columns 42a with the lower end of riser 84a communicating with storage chamber 60a adjacent the forward end of vessel 10. Riser 84a connects through a valve and metering unit 86a whereby the inflow of oil is regulated and quantity of oil taken aboard the storage vessel determined respectively. Production control apparatus, not shown, can be located in the one end column 42a in communication with riser 84a to separate out gas, silt, sulphur, and other impurities prior to delivery of the oil to storage chamber 60a.

A water-sludge separator is preferably employed when discharging sea water as hereinafter described to treat the sea water prior to discharge to remove the sludge. Particularly, the water sludge separator preferably includes a settlement process having tanks schematically illustrated at 90a located within columns 42a adjacent opposite sides of the vessel. Settlement tanks 90a receive sea water from storage chamber 60a via conduits 92a which terminate at their lower ends adjacent the hull bottom 28a. Sea water discharge conduits 94a communicate with the tanks 90a for discharging the treated water into the sea. In this manner, pollution of the surrounding sea water is avoided and the sludge can be stored in suitable tanks, not shown for subsequent use or disposal. Other sludge treatment processes can be employed if desired depending upon the nature of the sludge.

Figure 7:
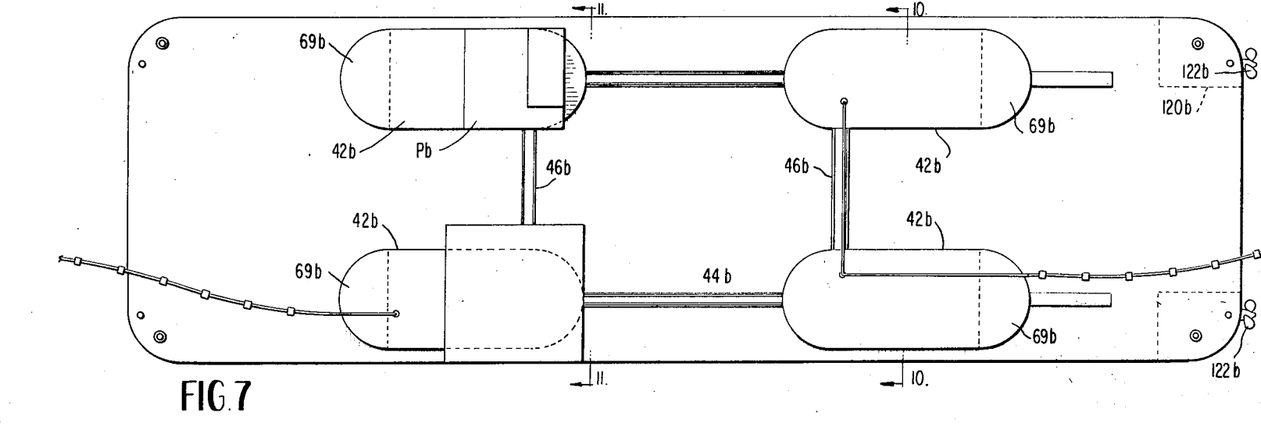
FIGURE 7 is a top plan view of another form of the semisubmersible oil storage vessel.
Figure 8:
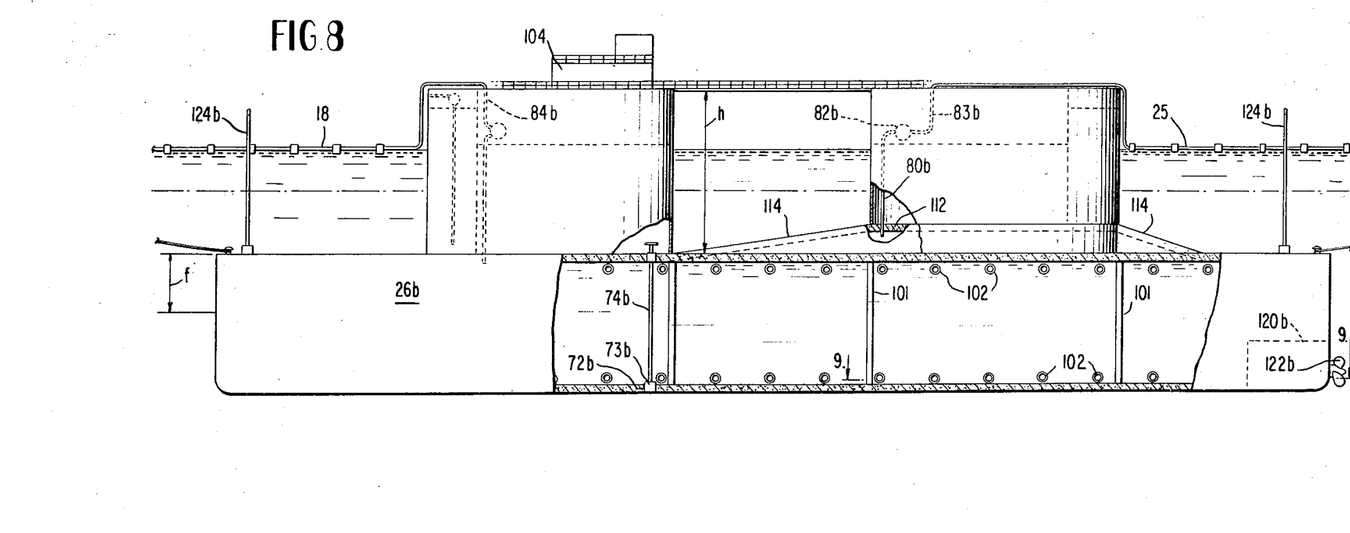
FIGURE 8 is a side elevational view thereof with portions broken away and in section for ease of illustration.
Figure 9:
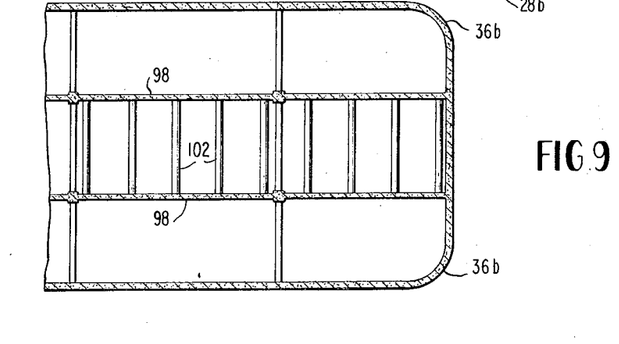
FIGURE 9 is a fragmentary horizontal sectional view thereof taken about on line 9—9 of FIGURE 8.
Figure 10:
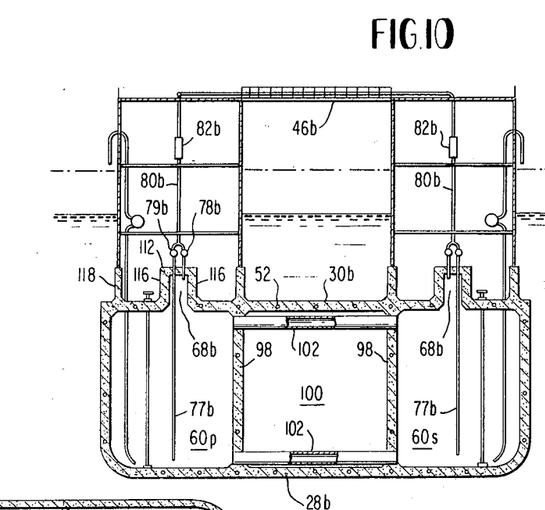
FIGURE 10 is a transverse sectional view thereof taken about on line 10—10 of FIGURE 7.
Figure 11:
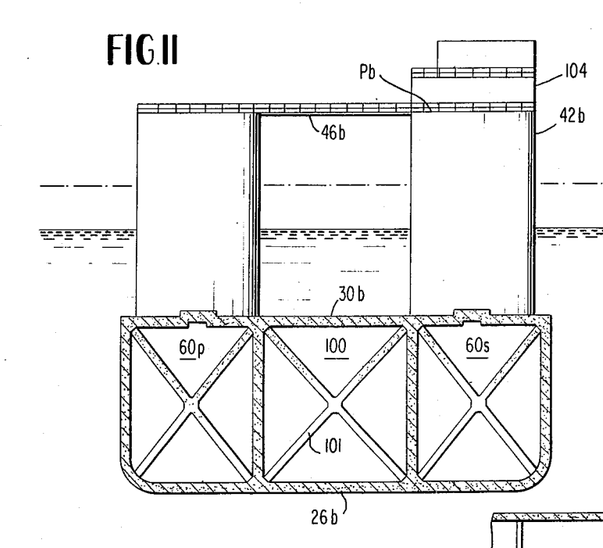
FIGURE 11 is a transverse sectional view thereof taken about on line 11—11 of FIGURE 7.
Figure 12:
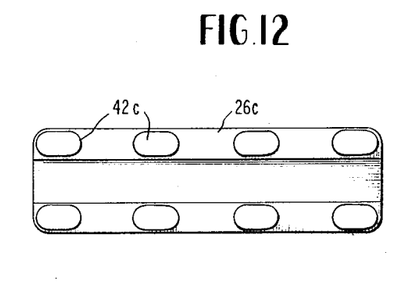
FIGURE 12 is a schematic plan view of another embodiment of the present vessel.

In the form of the present invention illustrated in FIGURES 7-11, vessel 10 comprises an elongated hull 26b having sufficient displacement to support vessel 10 in the unloaded condition in the low draft condition with hull 26b having freeboard indicated at f in FIGURE 8. Hull 26b is substantially rectangular in cross section as seen in FIGURES 10 and 11 having a bottom and upper wall 28b and 30b, respectively, and sidewalls 32b. Hull 26b has a storage chamber 60b including a pair of longitudinally extending, transversely spaced chambers 60p and 60s lying coextensive in length with vessel 10 along opposite sides thereof. A pair of longitudinally extending, transversely spaced bulkheads 98 define the inner walls of chambers 60p and 60s, respectively, and an intermediate buoyancy chamber 100 is disposed therebetween. Thus, oil/water chambers 60p and 60s are defined by bottom 28b, upper wall 30b, sidewalls 32b, and bulkheads 98, with the buoyancy chamber 100 being defined by bottom 28b, upper wall 30b, and bulkheads 98. Air chamber 100 also lies coextensive in length with vessel 10. Chambers 60p and 60s are in open communication one with the other, and to this end, vertically spaced pairs of conduits 102 extend through air chamber 100 connecting between bulkheads 98 at longitudinally spaced intervals along the full length of vessel 10. As in the previous embodiment, the bow and stern portions 36b (FIGURE 9) are arcuate in horizontal section.

As seen in FIGURES 7 and 8, a working platform Pb is located a predetermined height above hull 26b by a support structure comprising one of four stabilizing columns 42b provided in this embodiment. In this instance, platform Pb lies coincident with the upper deck of its support column 42b and a deck house 104 is provided including crew's quarters, pumping equipment, and other auxiliary equipment, and which may include the oil control facilities as well as oil production or treament facilities, not shown. In this form, a pair of stabilizing columns 42b are located on each of the opposite sides of the respective pitch and roll axes of vessel 10 and catwalks 44b and 46b interconnect between the upper decks of respective longitudinally and transversely spaced columns 42b.

Columns 42b, in this form, extend upwardly from the upper wall 30b of hull 26b an effective height h (FIGURE 8) to platform Pb or the upper decks of columns 42b substantially greater than the maximum anticipated wave height. As seen in FIGURE 7, columns 42b are similar in shape to the columns 42a of the previous embodiment in that columns 42b are preferably constant in cross section throughout their effective height and generally oblong shaped with longitudinally elongated vertical sides and semicylindrical fore and aft vertical end sections 50b. Columns 42b provide motion minimizing characteristics when the vessel is in the high draft condition with chambers 60p and 60s fully loaded with either sea water or oil and any intermediate oil-water loading thereof.

Hull 26b is also formed of prestressed concrete and, as seen in FIGURE 11, additional support structure may be provided in the form of a plurality of longitudinally spaced trusses 101 extending transversely in each of chambers 60p and 60s and air compartment 100. The trusses may be formed of concrete or of other material and additional cross bracing may be provided if desired. It is thus seen that hull 26b provides a large storage capacity in the provisions of intercommunicating chambers 60p and 60s which may be compartmented as desired. Also, the walls defining chambers 60s and 60p are preferably coated and lined with a plastic material similarly as in the previous embodiment. Air chamber 100 may house additional auxiliary equipment as desired. Access into air chamber 100 is provided through suitable hatches and ladders 110, and chamber 100 may also be compartmented and/or have additional support bracing as required.

As seen in FIGURES 8 and 10, raised oil discharge areas are provided above chambers 60p and 60s and are each defined by an upper wall portion 112 which projects upwardly within one of the pair of end columns 42b opposite the moored end of vessel 10 above upper hull wall 30b. Inclined walls 114 extend between upper walls 30b and 112. These horizontally extending wall portions 112 and inclined walls 114, together with the sidewalls 116, providing channels 68b raised above upper wall 30b and in free communication with the respective storage chambers 60p and 60s.

Columns 42b are preferably formed of steel, as before, and, to readily mount the columns 42b which overlie the raised oil discharge areas, on hull 26b, an oval wall or shell 118 formed of concrete provides a base for the pair of end columns 42b. This facilitates the construction and connection between the steel columns 42b and concrete hull 26b in these areas. The opposite end pair of columns 42b may be mounted directly on the upper wall 30b of hull 26b and it will be seen that the latter columns 42b are longer in length than those columns superposed over the raised oil discharge areas 68b. As in the previous embodiment, hull 26b would first be formed and floated with the columns 42b subsequently joined to the hull 26b. Each pair of columns 42b is spaced a predetermined distance from the roll and pitch axes of the vessel and has a predetermined area according to criteria described hereinafter to provide optimum vessel motion minimizing and stability characteristics. Semicylindrical trim tanks 69b are provided in each of the outer end portions of the columns 42b and pumps, not shown, are provided for independently and selectively ballasting and deballasting the tanks 69b to selectively alter the attitude of the vessel in the high draft conditions. Columns 42b can be vertically compartmented as before.

Similar oil intake and discharge conduits are provided chambers 60p and 60s as in the previous embodiment with oil intake line 84b communicating into storage chamber 60p. A cross conduit in communication with line 84b can be provided to conduct oil directly into the opposite storage chamber 60s if desired. Likewise, each chamber 60p and 60s is provided a water inlet check valve and opening 73b and 72b, respectively, and a water sludge separator similar to that employed in the previous embodiment. It is believed that further description of the oil and water inlet and discharging apparatus of this embodiment is unnecessary as these parts and their functions are hereinbefore adequately described. It will be noted that production control apparatus can be installed in the column 42b containing the oil inlet line 84b for the purpose noted previously.

It will be appreciated that a greater number of columns 42 may be provided. For example, in FIGURE 12, two pairs of columns 42c may be spaced on opposite sides of the pitch and roll axes and in generally symmetrical relation thereabout providing a column stabilized vessel having eight columns.

It will be also understood that the concrete hull arrangements 26a and 26b may be employed with each of the foregoing described column configurations. For example, the hull 26a may be provided with the column configuration depicted in the form hereof illustrated in FIGURES 7-11, that is, a four column vessel can be provided with a pair of columns disposed on hull 26a on opposite sides of its pitch and roll axes similarly as seen in FIGURES 7-11. Likewise, the hull 26b may be provided with the column configuration depicted in the form hereof illustrated in FIGURES 1-6, that is, a six column vessel can be provided with a pair of columns disposed on hull 26b on opposite sides of the pitch axis and a central pair of columns preferably disposed such that the pitch axis intersects the same. The eight column arrangement likewise can be provided with either type of hull 26a or 26b.

The operation of each of the embodiments hereof will be described with reference to the parts thereof by reference numerals only, it being understood that the operation of each of the embodiments is substantially identical and that, where different, the operation of the particular embodiment will be described with reference to the reference numeral and its following letter notation.

Vessel 10 is preferably towed to the oil production site in the surface floating condition with hull 26 having freeboard indicated at $f$. Thus, hull 26 is formed to provide a displacement when empty, i.e., when storage chamber 60 is devoid of sea water or oil, to support the entire weight of the vessel. When vessel 10 reaches the production site, lines 14 are deployed to moor the vessel to buoy 12. It will be appreciated that with this single point mooring to buoy 12, vessel 10 is free for circumferential movement about buoy 12 whereby the vessel will be naturally oriented to receive the oncoming waves against its moored end with the wave direction and longitudinal centerline of the vessel lying substantially parallel. By mooring the vessel in this manner, wave excitation forces on the vessel are substantially minimized.

To minimize and reduce the motion of the vessel when moored, vessel 10 is ballasted by actuating valve 73 to admit sea water into storage chamber 60 through opening 72 in bottom 28 to submerge hull 26 below the mean waterline. The sea water ballast completely fills chamber 60 (the latter being vented through conduit 76, riser 80 and pump unit 78) to submerge hull 26 and portions of columns 42. Valve 73 is preferably a check valve which admits water only. The hull 26 and the columns 42 are formed such that the displacement of hull 26 and the submerged column portions, in the sea water ballast condition, maintain the vessel floating semisubmerged with the distance between the mean waterline and platform P no less than half the anticipated wave height. Thus, before any oil enters the storage vessel, the maximum anticipated wave acts only against columns 42 and in the open area between the hull and platform. Moreover, the latter wave impaction is generally against the frontal area of the columns due to the single point mooring whereby the vessel is naturally oriented to receive the waves moored or bow end on. In this manner, the adverse effect of wave action on the vessel is reduced and the vessel has excellent motion minimizing characteristics in the sea water ballasted floating semisubmerged condition. With the vessel moored and fully ballasted with sea water, vessel 10 is ready to receive oil from the production site.

As oil flows into storage chamber 60 via oil intake lines 22, 16, 18 and 84 and through valve metering unit 86, the sea water is displaced from chamber 60 preferably through the water-sludge separators wherein the sludge is separated from the water by the separators. The sludge may then be stored for subsequent use or disposal and the sludge-free water discharged overboard without danger of polluting the surrounding sea. Due to the substantial immiscibility of water and oil and the lower specific gravity of crude oil relative to water, a relatively definitive oil-water interface is created within storage chamber 60, as indicated at I in FIGURES 5 and 8, the oil accumulating in chamber 60 above the seat water ballast as oil flows into chamber 60 displacing the sea water therein. Alternatively, where the water-sludge separator is not employed, valved opening 72 can be left open such that sea water from chamber 60 which is displaced by the oil can be discharged through opening 72.

At full capacity, the oil substantially fills chamber 60. However, the sea water ballast is not entirely displaced from chamber 60 and an oil-water interface is maintained slightly above bottom 28 such that oil is not lost through openings 72 due to limited vessel motion and to the very slight miscibility of water and oil. It will be appreciated that at all times during the employment of vessel 10 as a storage vessel, chamber 60 is completely filled with fluid, i.e., either oil or water or both with the oil floating on the top of the sea water. This feature eliminates the explosion hazard.

It is a significant feature of the present semisubmersible oil storage vessel that the vessel motion due to wave action is minimized in the sea water ballasted condition, in the oil loaded condition at full storage capacity and in any intermediate condition therebetween when loaded with both sea water and oil. This is accomplished by providing a hull and column structure having a displacement when the hull and portions of the columns are submerged such that the distance between the mean waterline and either the platform P or the upper surface of hull 26 is no less than half the maximum anticipated wave height in either the extreme loading conditions, i.e., the sea water ballasted condition or the oil loaded condition at full oil storage capacity, respectively, and between such limits when the vessel is loaded with both oil and water. The maximum anticipated wave is effective only against columns 42 when vessel 10 lies in the semisubmerged (high draft) condition and not against hull 26 or platform P$a$, or against the upper decks of the columns 42$b$ including the platform P$b$ of that embodiment. This condition, moreover, is satisfied throughout the full range of possible oil-water loadings. Thus, the vessel is subjected to minimum motion and force due to excitation forces caused by wave action.

Further, to afford additional motion minimizing characteristics to the vessel, the location and areas of columns 42 for a predetermined hull configuration are such as to preclude vessel motion amplification when the vessel is operating at semisubmerged (high draft) condition and in normally anticipated wave conditions. The range of periods of significant and normally anticipated waves lies generally within a range of about 8 to 14 seconds. Accordingly, the location and area of the columns 42 for a predetermined hull configuration in each of the embodiments of the vessel hereof are such that the natural period of the vessel exceeds the upper limit of this range of wave periods. Preferably, the locations and areas of the columns 42 are such that the natural vessel period should exceed such upper limit by at least 4 seconds. Thus, the columns are located relative to the pitch and roll axes as to provide long periods of roll, pitch and heave. In this manner, the vessel does not respond in resonance to and the motions thereof are not amplified by the maximum anticipated wave.

The foregoing vessel, moreover, has optimum stability characteristics in the semisubmerged high draft condition. The columns 42 are designed to provide an adequate righting movement to return the vessel to a level position. Columns 42, moreover, provide a roll sufficiently slow as to preclude tossing about of operating personnel on platform P, and oil-water intermingling at interface I. The roll rate is sufficiently fast to provide adequate stability about the roll axis. The vessel attitude about heel and trim axes in the semisubmerged condition can be corected by selected ballasting or de-ballasting trim tanks 69. The stability characteristics and motion minimizing characteristics thus afforded vessel 10 are optimum for a vessel of the foregoing construction.

In an illustrative form of the present invention as embodied in the vessel illustrated in FIGURES 7–11, vessel 10 has an overall length of 400 feet and an overall hull beam of 124 feet. The effective height $h$ of stabilizing columns 42 is 60 feet. The centroids of columns 42 are equally spaced 40 feet from the vessel's longitudinal centerline. The columns 42 are longitudinally spaced one from the other 72 feet. The length of each column is 88 feet and the width is 36 feet, with the ends thereof being formed cylindrical in shape providing an overall area of approximately 2034 square feet per column. The gross volumetric capacity of storage chamber 60 is 1.4 million cubic feet with at net oil capacity of about 1.2 million cubic feet. It will be appreciated that vessels having greater or smaller capacities can be constructed in accordance with the principles hereof. The net change in draft between the sea water and oil loaded conditions at full capacity is about 15 feet. The natural period of this form of vessel is about 21 seconds.

It is a further and significant feature hereof that the possibility of pumping both water and crude oil from storage chamber 60 through the discharge conduits of tanker T is substantially eliminated. To this end, it will be noted that channels or areas 68 are located above upper wall 30 whereby the oil in chamber 60 will accumulate first in channels or areas 68, that is, the oil will seek its highest level in chamber 60, i.e., channels or areas 68. Thus, under normal conditions, oil is retained and trapped in channels 68 adjacent the oil discharge outlet 76 with the inclined walls 62a channeling oil toward apex portions 64a in the forms of FIGURES 1–6 and along wall 112 in the form of FIGURES 7–11, and this notwithstanding limited vessel motion about the pitch axis. The sidewalls defining areas 68 and the inboard location of channels 68 substantially eliminate the possibility of the oil-water interface extending into area 68 and this notwithstanding vessel motion about the roll axis. The highest point in storage chamber 60 and the point at which the oil will first accumulate is thus maintained adjacent the apex portions 64a or upper walls 112, as the case may be, each of which are directly adjacent the points at which oil discharge lines 76 communicate with storage chamber 60. This condition, moreover, is maintained throughout the full range of vessel motion whereby the need for additional oil-water separators as provided in previous oil storage facilities is completely eliminated.

It will be appreciated that when high sea states are encountered, great strain is imposed on buoy 12. To reduce this to within the capacity of the buoy, an auxiliary propulsion system may be provided vessel 10 and is schematically illustrated at 120. This may comprise any conventional type of propulsion system, for example, a pair of diesel engine operated propellers 122. Thus, during high states, the propulsion system can be actuated to substantially reduce the strain imposed on buoy 12, preferably in proportion to the wave force.

The vessel is completely self-contained when on station adjacent an oil production site in that the crew's quarters, auxiliary equipment, including flow control facility and production control facilities if desired, and the like, are all located on board whereby oil receiving treatment, storage and transshipping operations to the tankers can be conducted continuously and over extended periods of time. Particularly, the crew's quarters are located on lower deck 40 (FIGURES 1–6) or in deck house 104 (FIGURES 7–11) as the case may be, with ample space being provided in columns 42 and the buoyancy chambers 34 for auxiliary equipment if necessary. Upper deck 38 in FIGURE 3 or the upper deck of one of columns 42b in FIGURE 7 may comprise a helicopter landing pad whereby the vessel 10 may be resupplied and personnel rotated. As seen in FIGURE 8, upright marker posts and lights indicated at 124 may be provided.

To move vessel 10 to another production site, as when the oil wells at a particular offshore site run dry or are producing only limited quantities of oil or for maintenance, the oil in storage chamber 60 is first transferred to a tanker in the foregoing described manner such that the chamber 60 is filled completely with sea water. Valved openings 72 are or remain closed, depending on whether sea water is displaced through openings 72 or through the water-sludge separators, respectively, normally closed valves 79 are opened and pumping unit 82 is actuated to pump sea water from chamber 60 via conduits 77, risers 80 and suitable water discharge conduits, not shown, connected to pumping units 82. As the water is pumped from chamber 60, the vessel emerges from its semisubmerged condition and, upon complete displacement of the sea water from chamber 60, assumes a low draft surface floating condition with the hull 26 having freeboard f. Vessel 10 may then be towed to another production site.

Certain basic principles are employed in the construction of the present semisubmersible oil storage vessel:

(1) An elongated hull is provided having sufficient displacement to float the vessel with the hull having freeboard, the hull having a large capacity storage chamber for receiving both sea water and oil and which is always filld during storage operations. This also eliminates the explosion hazard.

(2) In the semisubmerged condition, the submerged portions of stabilizing columns 42 and the hull including the buoyancy chambers provide a combined displacement as to float the vessel in a semisubmerged condition meeting the requisites of points (5) and (6) below.

(3) To stabilize the vessel when semisubmerged and throughout the full range of submergence in the sea water and/or oil loaded conditions, the columns 42 have a predetermined area which is constant in cross section throughout the effective height thereof.

(4) The effective height of the stabilizing columns 42, which is defined by the distance $h$ between the upper surface of the buoyancy chambers 34 and platform P, is greater than the maximum anticipated wave height from crest to trough.

(5) When semisubmerged, stabilizing columns 42 and hull 26 have sufficient volumetric displacement such that the distances between the mean waterline and the platform P and between the top of hull 26 and the mean waterline are no less than half the maximum anticipated wave height when the hull is ballasted with sea water and loaded with oil to capacity, respectively.

(6) The location and areas of the columns for a predetermined hull configuration are such that the natural period of the vessel is outside the normally anticipated range of periods of significant anticipated waves. The natural vessel period should preferably be at least four seconds in excess of the upper limit of this range.

(7) When semisubmerged, columns 42 provide stabilizing righting moments about the roll and pitch axes RA and PA, respectively, in proportion to their volumetric displacement and their respective distances from each such axis, whereby such righting stabilizing moments are of a magnitude to maintain the vessel within optimum limits of roll and pitch inclination and roll and pitch periods.

(8) The vessel should have at least four stabilizing columns arranged symmetrically about the longitudinal and transverse centerlines of the hull.

(9) The hull 26 is formed to provide a second chamber disposed above and in free communication with storage chamber 60, with the second chamber having a reduced horizontal cross sectional area compared with chamber 60 and having the oil discharge outlet opening thereinto whereby oil-water separation is maintained and only crude oil is transshipped to tanker T notwithstanding limited vessel motion.

(10) The hull is formed of prestressed concrete.

(11) The vessel has a propulsion unit sufficient to reduce the strain imposed on a single point mooring buoy to within its capacity.

In summary, the present invention provides a single hull semisubmersible oil storage vessel having a plurality of stabilizing columns 42 fixed at their lower ends to the hull and disposed symmetrically on opposite sides of the pitch and roll axes of the vessel. The stabilizing columns 42 support a working platform P, including crew's quarters and machinery spaces, a distance above the upper surface of the hull greater than the maximum anticipated wave height. Since the crew's quarters are located in or on the platform P and the machinery spaces may be located in or on platform P and/or columns 42, a large capacity storage chamber is formed in the hull which extends substantially coextensively with the length of the hull. The hull is preferably formed of prestressed concrete and has a displacement sufficient to float the entire vessel with the hull having freeboard $f$.

Upon reaching the oil production site, sea water is admitted to the storage chamber to submerge the hull and portions of the columns such that the distance between the mean waterline and the platform P is no less than half the maximum anticipated wave height. Oil is then introduced into the storage chamber and displaces the water therefrom whereby, when the storage chamber is loaded with oil to capacity, the distance between the mean waterline and the upper surface of the hull is no less than the maximum anticipate wave height. Accordingly, wave impaction against vessel 10 throughout its full range of submergence, i.e., between draft limits defined by the sea water ballast or oil loaded conditions or any intermediate oil-sea water loaded condition, is principally against the limited areas of columns 42. The location and areas of the columns for a predetermined hull configuration are such as to preclude vessel motion amplification for the range of periods of the anticipated significant waves. In this manner, the vessel obtains minimum motion characteristics. The strain imparted to the buoy is reduced to within the buoy's capacity by employment of the auxiliary propulsion system.

To offload oil, an oil discharge conduit opens into a second chamber superposed above storage chamber 60 and in free communication therewith. The second chamber has a reduced horizontal cross sectional area and, in this manner, oil-water separation is maintained and only crude oil is transshipped to tanker T notwithstanding the limited motion of the vessel. The chamber 60 may be pumped free of sea water after the oil is transshipped whereby vessel 10 may be refloated to the low draft condition for maintenance or towed to another production site.

The invention may be embodied in other specific forms without departing from the spirit or essential characteristics thereof.

What is claimed and desired to be secured by United States Letters Patent is:

1. A semisubmersible oil storage vessel comprising an elongated hull having a storage chamber, a platform, means upstanding from said hull in a direction generally normal to the longitudinal axis of said hull and including means connected to said hull and said platform to support said platform in spaced relation above said hull a predetermined effective height greater than the maximum anticipated wave height, said upstanding means including a plurality of stabilizing columns connected adjacent their lower end portions to said hull with at least a pair of said columns being spaced on each of the respective opposite sides of the pitch and roll axes of the vessel, said columns extending vertically above said hull a predetermined effective height greater than the maximum anticipated wave height, said hull having a displacement in a substantially unloaded condition sufficient to float the vessel with the hull having freeboard, and fluid transfer means in communication with said storage chamber including means for admitting sea water into said storage chamber to submerge the hull and portions of the columns and connecting means below the mean waterline and for discharging sea water from said storage chamber, said fluid transfer means further including means for admitting oil into said storage chamber, the displacement of the submerged hull and portions of said columns and connecting means being sufficient when said storage chamber contains sea water to capacity to maintain the vessel in semisubmerged condition such that the distance between the mean waterline and said platform is no less than half the maximum anticipated wave height and sufficient when said storage chamber is loaded with oil to capacity to maintain the vessel in semisubmerged condition such that the distance between the mean waterline and the upper surface of said hull is no less than half the maximum anticipated wave height, said upstanding means being spaced one from the other to provide an open area therebetween, said stabilizing columns being located to provide moment arms about roll and pitch axes such that the buoyancy forces act to establish righting moments proportional to the volumetric displacement of said submerged column portions, said stabilizing columns being located and having predetermined cross-sectional areas to provide motion minimizing characteristics in roll, pitch and heave in the semisubmerged condition, said fluid transfer means including an oil discharge conduit in communication with said chamber.

2. A vessel according to claim 1 wherein said platform support means comprises at least one of said stabilizing columns, said columns having a substantially uniform cross-sectional area throughout their height.

3. A vessel according to claim 1 wherein said platform support means comprises two of said stabilizing columns, said platform extending substantially horizontally between said two columns, said stabilizing columns having a substantially uniform cross-sectional area throughout their height.

4. A vessel according to claim 1 wherein said stabilizing columns are located adjacent the outboard sides of said hull with said pairs of columns being located adjacent opposite ends of the vessel, each of said columns having a length greater than its width and a substantially uniform cross-sectional area throughout its height, the moment arms extending from the pitch axis to the center of the stabilizing columns on opposite sides of the pitch axis being longer than the moment arms extending transversely from the roll axis to the center of the stabilizing columns on opposite sides of the roll axis.

5. A vessel according to claim 1 wherein said stabilizing columns are located adjacent the outboard sides of said hull with said pairs of columns being located adjacent opposite ends of the vessel, and means for ballasting and deballasting at least a portion of the end pairs of columns to selectively alter the attitude of the vessel in the semisubmerged boating condition.

6. A vessel according to claim 1 wherein said sea water discharging means includes an opening through the bottom of said hull.

7. A vessel according to claim 6 wherein said sea water admitting means includes said hull opening, and valve means for selectively permitting and preventing sea water communication through said opening.

8. A vessel according to claim 1 wherein said sea water admitting and discharging means includes an opening through said hull, the sea water being freely transferable through said opening into and out of said storage chamber in response to the respective discharge of oil from and the admission of oil into said storage chamber.

9. A vessel according to claim 1 wherein the sea water discharging means includes a water-sludge separator.

10. A vessel according to claim 1 wherein said hull is formed of concrete.

11. A vessel according to claim 1 wherein two pairs of said columns are spaced on each of the respective opposite sides of the pitch and roll axes.

12. A vessel according to claim 1 including a third pair of said columns with a column thereof lying on each side of the roll axis and substantially medially the length of the vessel.

13. A vessel according to claim 1 in combination with a mooring buoy, means for anchoring the vessel at one end thereof to said buoy such that the vessel is free to swing about said buoy and locate its anchored end in the face of the oncoming waves, said oil admitting means including a conduit extending from said buoy to the vessel.

14. A vessel according to claim 13 including a second buoy, means mooring said second buoy to the opposite end of said vessel for swinging movement with the vessel about said first buoy, said oil discharge conduit extending from the vessel to said second buoy.

15. A vessel according to claim 1 wherein the location and areas of said columns are such as to provide a natural vessel period outside the range of periods of the anticipated significant waves.

16. A vessel according to claim 1 including a second chamber disposed above said storage chamber and in free communication therewith, said second chamber having a reduced horizontal cross-sectional area relative to the cross-sectional area of said storage chamber, said oil discharge conduit having an intake opening into said second chamber for removing oil from said storage chamber.

17. A vessel according to claim 16 wherein said second chamber is elongated in the direction of the longitudinal axis of the vessel and has a pair of longitudinally extending top wall portions inclining upwardly toward one another to retain oil in said second chamber notwithstanding vessel pitching motion.

18. A vessel according to claim 1 wherein the maximum anticipated wave height is greater than 10 feet.

19. A semisubmersible oil storage vessel comprising a base flotation structure having a storage chamber, said base flotation structure having a longitudinal extent greater than its vertical extent, a plurality of upstanding stabilizing columns connected at their lower ends to said base structure and extending vertically above said base structure in a direction generally normal to the longitudinal extent of said flotation structure an effective height greater than the maximum anticipated wave height, said columns having a substantially uniform cross-sectional area throughout their effective height, fluid transfer means in communication with said storage chamber including means for admitting water into said storage chamber and for discharging water from said storage chamber, said base structure and portions of said columns being submerged below the mean waterline when said storage chamber contains water, said fluid transfer means including means for admitting oil into said storage chamber, the displacement of the submerged base structure and portions of said columns being sufficient when said storage chamber contains water to capacity to maintain the vessel in semisubmerged condition such that the distance between the mean waterline and the upper ends of said columns is no less than half the maximum anticipated wave height and sufficient when loaded with oil to capacity to maintain the vessel in semisubmerged condition such that the distance between the mean waterline and the upper surface of said base structure is no less than half the maximum anticipated wave height, said columns being spaced one from the other to provide an open frame area therebetween, said stabilizing columns being located to provide moment arms about the axes of vessel motion such that the buoyancy forces act to establish righting moments proportional to the volumetric displacement of said submerged column portions, said stabilizing columns being located and having predetermined cross-sectional areas to provide motion minimizing characteristics in the semisubmerged condition.

20. A vessel according to claim 19 including a second chamber disposed above said storage chamber and in free communication therewith, said second chamber having a reduced horizontal cross-sectional are relative to the cross-sectional area of said storage chamber, said oil discharge conduit having an intake opening into said second chamber for removing oil from said storage chamber.

21. A vessel according to claim 19 wherein said base structure comprises an elongated hull, at least a pair of said columns being spaced on each of the respective opposite sides of the pitch and roll axes of the vessel, said hull having a displacement in a substantially unloaded condition sufficient to float the vessel with the hull having freeboard.

22. A vessel according to claim 19 wherein said base structure is formed of concrete.

23. A vessel according to claim 22 wherein said water admitting and discharging means includes an opening passing through said base structure, the water being freely transferable through said opening into and out of said storage chamber in response to the respective discharge of oil from and the admission of oil into said storage chamber.

24. A vessel according to claim 19 including propulsion means.

25. A vessel according to claim 19 wherein said water discharge means includes a water-sludge separator.

26. A vessel according to claim 19 including at least six stabilizing columns with at least three columns being located in generally longitudinal alignment one with the other on each side of the roll axis of the vessel and along outboard portions of the vessel.

27. A vessel according to claim 19 wherein the location and areas of said columns are such as to provide a natural vessel period outside the range of periods of the anticipated significant waves.

28. A vessel according to claim 19 wherein the maximum anticipated wave height is greater than 10 feet.

29. A semisubmersible oil storage vessel comprising an elongated hull formed of concrete material and having a storage chamber, a plurality of spaced stabilizing columns upstanding from said hull with at least a pair of said columns being spaced on each of the respective opposite sides of the pitch and roll axes of the vessel, said hull having a displacement sufficient to float the vessel with the hull having freeboard, said hull having an opening for receiving sea water to submerge the hull and portions of the columns below the mean waterline, a conduit connected to said storage chamber for communicating oil into said storage chamber and thereby to displace the sea water in said storage chamber through said opening, and an oil discharge conduit in communication with said storage chamber for transferring oil from said storage chamber, said hull and the submerged portions of said columns having sufficient displacement when the storage chamber is fully loaded with water or substantially fully loaded with oil such that the mean waterline is located along said columns above the upper surface of said hull, said stabilizing columns being located about roll and pitch axes such that the buoyancy forces act to establish righting moments proportional to the volumetric displacement of said submerged column portions, said stabilizing columns being located and having predetermined cross-sectional areas to provide motion minimizing characteristics in roll, pitch and heave in the semisubmerged condition.

30. A vessel according to claim 29 including a second chamber disposed above said storage chamber in free communication therewith, said second chamber having a reduced horizontal cross-sectional area relative to the cross-sectional area of said storage chamber, said oil discharge conduit having an intake opening into said second chamber for removing oil from said storage chamber.

31. A vessel according to claim 29 including a working platform supported in spaced relation above said hull, at least one of said columns providing at least part of the support for said platform.

32. A vessel according to claim 29 wherein said hull includes a pair of buoyancy chambers on opposite sides of the roll axis and superposed over said storage chamber, said columns lying in superposed relation to said buoyancy and storage chambers with the lower ends of said columns being connected to the upper sides of said buoyancy chambers.

33. A vessel according to claim 29 including a second chamber disposed above said storage chamber in free communication therewith, said second chamber having a reduced horizontal cross-sectional area relative to the cross-sectional area of said storage chamber, said oil discharge conduit having an intake opening into said second chamber for removing oil from said storage chamber.

34. A vessel according to claim 29 wherein said hull has a length to width ratio of at least 2 to 1.

35. A semisubmersible oil storage vessel comprising an elongated hull formed to provide a storage chamber, a plurality of spaced stabilizing columns upstanding from said hull in a direction generally normal to the longitudinal axis of said hull, at least a pair of said columns being spaced on each of the respective opposite sides of the pitch and roll axes of the vessel, said hull having a displacement sufficient to float the vessel with the hull having freeboard, fluid transfer means in communication with said storage chamber including means for admitting sea water into said storage chamber to submerge the hull and portions of the columns below the mean waterline and for displacing water from said storage chamber, said transfer means including a conduit in communication with said storage chamber for transferring oil into said storage chamber and an oil discharge conduit in communication with said storage chamber for transferring oil from said storage chamber, said hull and the submerged portions of said columns having sufficient displacement when the storage chamber is fully loaded with water or substantially fully loaded with oil such that the mean waterline is located along said columns above the upper surface of said hull, said stabilizing columns being located about roll and pitch axes and having predetermined areas such as to provide a natural period of the vessel outside the range of periods of the anticipated significant waves, said stabilizing columns being located and having predetermined cross-sectional areas to provide motion minimizing characteristics in roll, pitch and heave in the semisubmerged condition.

36. A vessel according to claim 35 wherein said water displacing means includes a water-sludge separator.

37. A vessel according to claim 35 in combination with a mooring buoy, means for mooring the vessel at one end thereof to said buoy such that the vessel is free to swing about said buoy and locate its moored end in the face of the oncoming waves, said oil conduit extending from said buoy to said vessel, a second buoy, means mooring said second buoy to the opposite end of said vessel for swinging movement with the vessel about said first buoy, said oil discharge conduit extending from the vessel to said second buoy.

38. A vessel according to claim 37 in combination with a tanker, means mooring said tanker to said second buoy, said tanker and said second buoy being otherwise free of restraint.

39. A vessel according to claim 35 wherein the natural period of the vessel exceeds the upper limit of said range of wave periods by at least 4 seconds.

40. A vessel according to claim 35 having a natural period of about 21 seconds.

41. A semisubmersible oil storage vessel comprising an elongated hull having a storage chamber, a plurality of spaced stabilizing columns upstanding from said hull in a direction generally normal to the longitudinal axis of said hull with at least a pair of said columns being spaced on each of the respective opposite sides of the pitch and roll axes of the vessel, said columns being located adjacent outboard sides of said hull, said hull having a displacement in a substantially unloaded condition sufficient to float the vessel with the hull having freeboard, fluid transfer means in communication with said storage chamber including means for admitting sea water into said storage chamber to submerge the hull and portions of the columns below the mean waterline and for discharging sea water from said storage chamber, said fluid transfer means further including means for admitting oil into and discharging oil from said storage chamber, said hull and the submerged portions of said columns having sufficient displacement when the storage chamber is fully loaded with water or substantially fully loaded with oil such that the mean waterline is located along said columns above the upper surface of said hull, the moment arms extending from the pitch axis to the center of the stabilizing columns on opposite sides of the pitch axis being longer than the moment arms extending transversely from the roll axis to the center of the stabilizing columns on opposite sides of the roll axis, said stabilizing columns being located about roll and pitch axes such that the buoyancy forces act to establish righting moments proportional to the volumetric displacement of said submerged column portions, said stabilizing columns being located and having predetermined cross-sectional areas to provide motion minimizing characteristics in roll, pitch and heave in the semisubmerged condition.

42. A vessel according to claim 41 wherein each of said columns has a length greater than its width and a substantially uniform cross-sectional area throughout its height, said columns extending longitudinally in a direction generally parallel to the longitudinal axis of the vessel.

43. A vessel according to claim 41 including means for ballasting and deballasting said vessel to selectively alter the attitude of the vessel in the semisubmerged floating condition.

44. A vessel according to claim 41 including means for ballasting and deballasting at least a portion of the end pairs of column to selectively alter the attitude of the vessel in the semisubmerged floating condition, said hull being formed of a concrete material.

45. A vessel according to claim 41 including a third pair of said columns with a column thereof lying on each side of the roll axis and substantially medially of the length of the vessel.

References Cited

UNITED STATES PATENTS

| | | | |
|---|---|---|---|
| 1,591,024 | 7/1926 | Dodge. | |
| 2,365,770 | 12/1944 | Nebolsine | 114—65 |
| 2,631,558 | 3/1953 | Harris | 114—0.5 |
| 3,254,620 | 6/1966 | Cannon | 114—0.5 |
| 3,360,810 | 1/1968 | Busking | 114—0.5 |
| 3,408,971 | 11/1968 | Mott | 114—0.5 |

TRYGVE B. BLIX, Primary Examiner

U.S. Cl. X.R.

114—74

PO-1050
(5/69)

UNITED STATES PATENT OFFICE
CERTIFICATE OF CORRECTION

Patent No. 3,507,238          Dated April 21, 1970

Inventor(s) PHILIP YEONG-WAI CHOW

It is certified that error appears in the above-identified patent and that said Letters Patent are hereby corrected as shown below:

Column 10, line 49, "movement" should read -- moment --. Column 14, line 44, "boating" should read -- floating --.

SIGNED AND
SEALED
JAN 5 1971

(SEAL)
Attest:

Edward M. Fletcher, Jr.
Attesting Officer

WILLIAM E. SCHUYLER, JR.
Commissioner of Patents